US009120929B2

(12) United States Patent
Bennett et al.

(10) Patent No.: US 9,120,929 B2
(45) Date of Patent: Sep. 1, 2015

(54) MAKING HIGH DENSITY POLYMER PARTICLES

(75) Inventors: James R. Bennett, Rochester, NY (US); Mridula Nair, Penfield, NY (US); Peter David Rollinson, Rochester, NY (US); Rajesh Vinodrai Mehta, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 460 days.

(21) Appl. No.: 13/548,675

(22) Filed: Jul. 13, 2012

(65) Prior Publication Data

US 2014/0017401 A1    Jan. 16, 2014

(51) Int. Cl.
| | | |
|---|---|---|
| *B05D 7/02* | (2006.01) | |
| *C09D 1/00* | (2006.01) | |
| *C09D 5/02* | (2006.01) | |
| *C09D 11/40* | (2014.01) | |
| *B05D 5/00* | (2006.01) | |
| *C09D 11/00* | (2014.01) | |
| *C09D 11/30* | (2014.01) | |
| *C09D 11/326* | (2014.01) | |
| *C08F 257/02* | (2006.01) | |
| *C08F 2/20* | (2006.01) | |
| *C08F 2/44* | (2006.01) | |

(52) U.S. Cl.
CPC .. *C09D 1/00* (2013.01); *B05D 5/00* (2013.01); *B05D 7/02* (2013.01); *C08F 257/02* (2013.01); *C09D 5/022* (2013.01); *C09D 11/00* (2013.01); *C09D 11/30* (2013.01); *C09D 11/326* (2013.01); *C09D 11/40* (2013.01); *C08F 2/20* (2013.01); *C08F 2/44* (2013.01)

(58) Field of Classification Search
CPC ............ B05D 5/00; B05D 7/02; C09D 11/30; C09D 11/00; C09D 11/40; C09D 5/022
USPC .......................................................... 427/216
See application file for complete search history.

(56) References Cited

U.S. PATENT DOCUMENTS

| | | | | |
|---|---|---|---|---|
| 4,360,611 A | * | 11/1982 | Wakimoto et al. | ............ 523/216 |
| 4,620,987 A | * | 11/1986 | Yamashita et al. | ............ 427/131 |
| 5,262,269 A | * | 11/1993 | Nair et al. | ................ 430/137.17 |
| 5,679,138 A | | 10/1997 | Bishop et al. | |

OTHER PUBLICATIONS

Elaissari, Abdelhamid,"Colloidal Polymers: Synthesis and Characterization: vol. 115", Marcel Dekker Inc, 2003, pp. 158-159.*
Psyclops.com, "Density of Materials", http:/www.psyclops.com/tools/technotes/materials/density.html, Nov. 9, 2009.*
LobaChemie, "Carboxymethylcellulose Sodium Salt High Viscosity", Feb. 24, 2013.*
O'Leary, "Sodium Chloride: Properties of Sodium Chloride", Hypertext Copyright, Dec. 21, 2007.*

* cited by examiner

*Primary Examiner* — Erma Cameron
(74) *Attorney, Agent, or Firm* — Raymond L. Owens

(57) ABSTRACT

A method of making a high density organic polymeric particle, suitable for use in milling, includes the steps of: providing an oil phase including a high density metal, a metal modifying agent, a cross-linkable organic monomer mixture, and an oil soluble polymerization initiator; admixing the oil phase under high shear conditions in an aqueous medium to produce droplets of the oil phase in the aqueous medium; and adding a hydrocolloid to the aqueous medium containing the droplets of the oil phase. The method further includes polymerizing the droplets of the oil phase to produce high density organic polymeric particles comprising a cross-linked polymer host matrix and a high density metal wherein the high density metal is within the interior of the cross-linked polymer host matrix.

18 Claims, No Drawings

MAKING HIGH DENSITY POLYMER PARTICLES

CROSS-REFERENCE TO RELATED APPLICATIONS

Reference is made to commonly-assigned, U.S. patent application Ser. No. 13/548,690 filed Jul. 13, 2012, now U.S. Pat. No. 8,815,395, entitled "High Density Polymer Particles and Dispersion of Same" by David F. Jennings, et al., the disclosure of which is incorporated herein.

FIELD OF THE INVENTION

This invention relates to producing high density polymer particles.

BACKGROUND OF THE INVENTION

Ink jet printing is a non-impact method for producing images by the deposition of ink droplets on a substrate (paper, transparent film, fabric, or other like materials.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor light fastness. When water is used as the carrier, such inks also generally suffer from poor water fastness.

Pigment based inks have been gaining in popularity as a way of addressing these limitations. In pigment-based inks, the colorant exists as discrete particles. These pigment particles are typically treated with addenda known as dispersants or stabilizers which serve to keep the pigment particles from agglomerating and settling out of the carrier. Pigment-based inks suffer from a different set of deficiencies than dye-based inks. These deficiencies are the result of the fact that prior-art pigment-based inks display particle sizes and particle size distributions which can vary widely from pigment to pigment. This often requires costly and time-consuming filtration steps and often leads to plugging of the orifices of the ink jet printer. This dramatically limits the number of available pigments which can be used in ink jet printing processes. For example, although pigments in a wide variety of colors have been described in the prior art, commercially available ink jet inks have thus far been limited to black inks based on carbon black.

U.S. Pat. No. 5,679,138 describes a process for milling a pigment for use in an inkjet ink where the pigment is milled using rigid milling media until 90% by weight of the pigment particles have a size less than 100 nm. The rigid milling media are preferably polymeric milling media having an average diameter of 50 microns which is considerably smaller than conventional ceramic milling media. Beads used in the example are highly crosslinked polystyrene such as poly(styrene-co-divinylbenzene) 20/80.

U.S. Pat. No. 5,262,269 teaches a method of making pigmented toner particles produced by a limited coalescence technique resulting in particles of a non-crosslinked solid polymer matrix with pigment dispersed in the interior regions of the polymer matrix. The pigment can be a magnetic oxide, including ferric and ferrous oxides, and cobalt oxides.

There is a need for making polymeric particles with high density.

SUMMARY OF THE INVENTION

These and other aspects of the invention are generally accomplished by a method of making a high density organic polymeric particle, suitable for use in milling, comprising the steps of: (a) providing an oil phase comprising a high density metal, a metal modifying agent, a cross-linkable organic monomer mixture, and an oil soluble polymerization initiator; (b) admixing the oil phase under high shear conditions with an aqueous medium to produce droplets of the oil phase in the aqueous medium; (c) adding a hydrocolloid to the aqueous medium containing the droplets of the oil phase; (d) polymerizing the droplets of the oil phase to produce high density organic polymeric particles comprising a cross-linked polymer host matrix and a high density metal wherein the high density metal is within the interior of the cross-linked polymer host matrix.

Other and further aims, features, advantages, uses, and the like will be apparent to those skilled in the art when taken with the accompanying claims.

DETAILED DESCRIPTION OF THE INVENTION

The invention is generally accomplished by a method of making high density organic polymeric particle, suitable for use in milling, comprising the steps of: (a) providing an oil phase comprising a high density metal, a metal modifying agent, a cross-linkable organic monomer mixture, and an oil soluble polymerization initiator; (b) admixing the oil phase under high shear conditions with an aqueous medium to produce droplets of the oil phase in the aqueous medium; (c) adding a hydrocolloid to the aqueous medium containing the droplets of the oil phase; (d) polymerizing the droplets of the oil phase to produce high density organic polymeric particles comprising a cross-linked polymer host matrix and a high density metal wherein the high density metal is within the interior of the cross-linked polymer host matrix.

The method of the invention can comprise one or more of the following additional steps: (e) washing and removing the silica from the surface of the high density organic polymeric particles, or (f) isolating and drying said particles.

The oil phase of the invention comprises a high density metal, a metal modifying agent, a cross-linkable organic monomer mixture, and an oil soluble polymerization initiator. The oil phase is generally immiscible with water.

The high density metal is generally added to the oil phase in particulate form. It can be added as a slurry of the particulate in a liquid medium compatible with the cross-linkable organic monomer mixture of the invention or directly to the cross-linkable organic monomer mixture of the invention. The high density metal is at least 5 weight %, preferably at least 10 weight %, more preferably at least 15 weight % of the total weight of the mixture comprising the high density metal and the cross-linkable organic monomer mixture.

The high density metal of the invention is generally selected to increase the amount of mass added to a particle without substantially adding volume to the particle. Accordingly, it is desirable to reduce the number of particles added in order to reduce interference in the polymerization reaction and also the degree of cross-linking achieved in the particle.

This is generally accomplished through the selection of a metal with a density of greater than or equal to 8.0 g/cc, preferably greater than or equal to 10.0 g/cc.

The high density metal can be selected from the group including iridium, tungsten, gold, lead, silver, molybdenum, copper, cobalt, nickel, brass or their compounds such as oxides and carbides. The high density metal can be employed alone or in combination in the process and particles of the invention. The high density metal of the invention is preferably tungsten. A tungsten powder suitable for use in the invention has a mean diameter of 0.84 μm and is obtainable from Buffalo Tungsten (Depew, N.Y.)

Since the high density metal particles should be smaller in size than the dispersed droplets in the aqueous medium in accordance with the present invention, and since the dispersed droplets can be only a few microns in particle size (diameter), the high density metal particles should generally be in the sub-micron size range at the time of their use in this invention.

At the time when the oil phase droplets are dispersed in the aqueous medium, high density metal particles should have a surface hydrophobicity which is equal to or greater than that of the liquid phase of the individual droplets so that the high density metal particles are contained within the droplets.

In order to prepare a high density metal having a size as indicated above, it can be desirable to reduce the particle size of the high density metal aggregates from an initial size to a submicron size via known processes, such as ball milling.

In general, the high density particles of the invention suitable for use herein comprise polymeric resins which are chemically and physically inert, and of sufficient hardness and friability to enable them to avoid being chipped or crushed during milling. The preferred method of making the high density particles of the invention is by suspension polymerization of acrylic and styrenic monomers along with crosslinking monomer.

In accordance with the invention, the polymeric milling media is sufficiently crosslinked to prevent the high density metal from separating from the oil phase into the aqueous medium and settling out. Any co-monomer with more than one ethylenically unsaturated group can be used in the preparation of the high density particles to provide the crosslinking functionality, such as divinylbenzene and ethylene glycol dimethacrylate.

The critical amount of crosslinking monomer required to be incorporated into the polymer to prevent the high density metal from separating from the oil phase into the aqueous medium and settling will depend upon the high density metal, the metal modifying agent, and the non-crosslinkable monomer selected. In general, however, it will be advantageous to provide at least about 10 mole %, more preferably at least 20 mole %, and most preferably at least about 25 mole % crosslinking monomer, and use of polymers of the following formula are preferred:

$$(A)_x(B)_y \qquad (I)$$

where A is derived from one or more monofunctional ethylenically unsaturated monomers, B is derived from one or more monomers which contains at least two ethylenically unsaturated groups, x is from 0 to about 90 mole %, and y is from about 10 to 100 mole %, preferably from about 20 to 100 mole %, and most preferably from about 25 to 100 mole %. If less than about 10 mole % crosslinking monomer is included, the high density metal can separate from the oil phase and settle out, result in low density particles.

Suitable ethylenically unsaturated monomers which can be used as component A can include, for example, the following monomers and their mixtures: acrylic monomers, such as acrylic acid, or methacrylic acid, and their alkyl esters such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate; the hydroxyalkyl esters of the same acids, such as, 2-hydroxyethyl acrylate, 2-hydroxyethyl methacrylate, and 2-hydroxypropyl methacrylate; the nitrites and amides of the same acids, such as, acrylonitrile, methacrylonitrile, acrylamide and methacrylamide; vinyl compounds, such as, vinyl acetate, vinyl propionate, vinylidene chloride, vinyl chloride, and vinyl aromatic compounds such as styrene, t-butyl styrene, ethylvinylbenzene, vinyl toluene; dialkyl esters, such as, dialkyl maleates, dialkyl itaconates, dialkyl methylene-malonates and the like. Preferably, monomer A is styrene, vinyl toluene, ethylvinylbenzene, or methyl methacrylate. Methyl methacrylate and styrene are preferred monomers because they are inexpensive, commercially available materials which make acceptable cross-linked polymer host matrix of the high density particles, especially when used as polymeric grinding media. Most preferably monomer A is styrene. Suitable ethylenically unsaturated monomers which can be used as component B are monomers which are polyfunctional with respect to the polymerization reaction, and can include, for example, the following monomers and their mixtures: dienes such as butadiene and isoprene; esters of saturated glycols or diols with unsaturated monocarboxylic acids, such as, ethylene glycol diacrylate, ethylene glycol dimethacrylate, triethylene glycol dimethacrylate, 1,4-butanediol dimethacrylate, 1,3-butanediol dimethacrylate, pentaerythritol tetraacrylate, trimethylol propane trimethacrylate and polyfunctional aromatic compounds such as divinylbenzene and the like. Preferably, monomer B includes ethylene glycol dimethacrylate, ethylene glycol diacrylate, 1,4-butanediol dimethylacrylate or divinylbenzene. Most preferably, monomer B is divinylbenzene. The cross-linkable organic monomer mixture comprises at least 10 weight % of a cross-linkable monomer, preferably at least 25 weight %, up to 100% cross-linkable monomer. The cross-linkable monomer is preferably divinylbenzene, and the non-crosslinkable monomer is preferably styrene. These are preferably employed such that the divinyl benzene is at least 11 weight % of the sum of the weights of styrene and divinylbenzene, more preferably at least 25 weight % of the sum of the weights of styrene and divinylbenzene, most preferably at least 40 weight % of the sum of the weights of styrene and divinylbenzene. It is also possible to employ 100% divinylbenzene.

As to divinylbenzene, although available as pure monomer for laboratory use, it is most commonly sold commercially as a mixture of divinylbenzene and ethylvinylbenzene, available, for instance, from Dow Chemical Company as DVB-55 (typical assay 55.8% divinylbenzene and 43.0% ethylvinylbenzene) or DVB-HP (typical assay 80.5% divinylbenzene and 18.3% ethylvinylbenzene). For polystyrene particles crosslinked with divinylbenzene used comprising styrene monomer in accordance with preferred embodiments of the invention, it is generally preferable to include at least about 20 wt % of commercially available (55% assay) divinylbenzene into the polystyrene polymer, thereby providing at least about 11 mole % crosslinking monomer, and a copolymer of 20 wt % styrene, 80 wt % commercial (55% assay) divinylbenzene is especially preferred, providing about 44 mole % crosslinking monomer.

In accordance with the invention, a metal modifying agent is generally employed to modify the surface of the high density metal to render it hydrophobic enough to stay in the oil droplets. The metal modifying agent is preferably a block copolymer and preferably comprises blocks of styrenic monomers, combined with blocks of polyolefins such as butadiene, ethylene, butylenes, and combinations thereof. It is preferably selected from Tuftec P2000-SBBS, a hydrogenated triblock copolymer of Styrene/Butadiene/Styrene (from Asahi Kasei Chemicals Corporation) or Kraton G1652-SEBS, a triblock copolymer based on Styrene and Ethylene/Butylene (from Kraton Polymers).

Initiation of the polymerization reaction resulting in the high density particles containing a cross-linked organic polymer host matrix is generally accomplished through the incorporation of an oil soluble polymerization initiator and subjecting the initiator to sufficient stimulus such that it causes a polymerization reaction to occur, such as increased temperature or exposure to ultraviolet energy. Examples of suitable initiators for such a suspension polymerization include organic soluble free radicals e.g., Vazo 52 (DuPont) 2,2'-azobis(2,4-dimethylnitrate) and benzoyl peroxide. A preferred oil soluble polymerization initiator is benzoyl peroxide.

In the practice of the processes of this invention, an aqueous medium is employed. This medium contains dispersed therein optional colloidally sized droplet suspending agents which function to control particle size and size distribution in the high density particles of the invention.

Suitable colloidal suspending agents include, for example, calcium phosphate, silica, alumina, methyl cellulose, and the like. One presently preferred type of suspending agent is colloidal silica. Another presently preferred type of suspending agent is an aqueous latex of a colloidal copolymer which comprises:

(a) about 25 to about 80 weight percent of an addition polymerizable oleophilic monomer;

(b) about 5 to about 45 weight percent of an addition polymerizable hydrophilic monomer;

(c) about 1 to about 50 weight percent of an addition polymerizable ionic monomer; and (d) about 8 to about 20 weight percent of a cross-linking monomer having at least two addition polymerizable groups.

Preferably, the copolymer comprises about 35 to about 65 weight percent oleophilic monomer, about 10 to about 35 weight percent hydrophilic monomer, about 10 to about 20 weight percent ionic monomer, and about 10 to about 15 weight percent cross-linking monomer.

The particulate colloidally sized suspending agent is preferably silica. While the oil phase is dispersed as droplets in the aqueous phase, the colloidal suspending agents serve as a third phase. These agents as a class are insoluble in both the aqueous phase and the non-aqueous phase; however, these agents are in effect wetted by both. The colloidal suspending agents are more hydrophilic than oleophilic, and more hydrophilic than the dispersed or suspending droplets; thus, they remain at the interface of the aqueous phase and the suspended droplets. The colloidal suspending agents substantially uniformly cover the surface of the suspended droplets and can be regarded as forming a layer on such droplets.

The aqueous medium can optionally contain a water soluble high density metal salt, preferably sodium polytungstate in order to achieve further density increases.

A hydrocolloid is added to the aqueous medium after the droplets are formed to further stabilize the droplets during polymerization. A preferred hydrocolloid stabilizer is gelatin.

The quantity of colloidal suspending agent present in such aqueous medium typically is in the range of about 0.2 to about 20 weight percent on a 100 weight percent total aqueous medium basis, and preferably in the range of about 0.5 to about 6 weight percent.

In accordance with the present invention, a limited coalescence suspension polymerization process is used to produce high density polymer particles. Thus, a high density metal is dispersed in a cross-linkable organic monomer mixture by known techniques together with a metal modifying agent and an oil soluble polymerization initiator, as described herein.

The resulting oil phase is then admixed under high shear conditions with the aqueous medium described above to produce a suspension of micron-sized droplets of the oil phase in the aqueous medium. Typically, these droplets are highly uniform in size and the size is in the range of 2 to about 200 microns, preferably 20 to 100 microns, more preferably 30 to 80 microns. During the high shear mixing, equilibrium is reached as regards droplet size. Droplet size deviation is typically about +/−. 25% of the mean diameter and is presently preferred, although somewhat larger and smaller such deviations are acceptable.

Next, the monomer mixture in the suspended droplets is polymerized. The polymerization can be accomplished by heating or irradiating the droplet suspension under mild to moderate agitation. An initiator that is included in the oil phase before it is admixed with the aqueous medium promotes the polymerization. Examples of suitable initiators for such a suspension polymerization include organic soluble free radicals e.g., Vazo 52 (DuPont) 2,2'-azobis(2,4-dimethylnitrate) and benzoyl peroxide.

Typical suspension heating temperatures are in the range of about 30° C. to about 100° C. However, the particular conditions used for polymerization in any given situation depend upon a number of variables, such as the monomer composition, the initiators present, and the like. The use of gentle continuous agitation aids in preventing droplet agglomeration or coalescing.

After polymerization is complete, the particles can be isolated from the aqueous medium by any conventional way, including settling, filtration, centrifuging, combinations thereof, or the like. Isolation of the particles can be accomplished through known techniques such as filtration of a suspension of the particles through sintered glass, glass fiber or polymer fiber filter media.

After isolation, the particles are preferably washed with water and residual suspending agents removed. In the case, for example, of silica, it can be removed by washing with a dilute aqueous alkali metal or ammonium hydroxide by adjustment of the pH of a suspension of the particles to pH greater than or equal to 12 for approximately 30 minutes or more. If washed with base, the particles are thereafter further water washed until a neutral pH (about 7) is reached. The resulting particles are then conveniently drained and dried to remove residual water.

Drying of the particles can be accomplished subjecting the suspension or damp filter cake to temperatures sufficient to evaporate the water of the aqueous medium. A suitable drying temperature is in the range of about ambient to about 60° C. applied for times of about 3 to about 24 hours.

The high density organic polymeric particles produced by such a suspension polymerization and drying process have a particle size diameter that is preferably in the range of about 2 to about 200 microns, preferably 20 to 100 microns, more preferably 30 to 80 microns.

Particles of this invention on a 100 weight percent total weight basis comprise:

about 5 to about 30 weight percent of high density metal about 0.5 to about 10 weight percent of metal modifying agent; and about 60 to about 94.5 weight percent of cross-linked polymer host matrix.

Additionally, on the same basis, high density particles of the invention can contain from 0.005 up to about 5 weight percent of a colloidal stabilizer.

The term "particle size" as used herein, or the term "size," or "sized" as employed herein in reference to the term "particles," is defined as the particle diameter as measured by a Horiba LA 920 Particle Size Distribution Analyzer from Horiba Scientific.

The method of the invention produces high density particles suitable for milling. The milling particles of the invention comprise a) a cross-linked organic polymer host matrix; and b) a high density metal provided within the interior of the cross-linked organic polymer host matrix.

The density of the particle is preferably greater than 1.25 g/cc, more preferably greater than 1.30 g/cc. The diameter of the particle can be from 2 to about 200 microns, preferably 20 to 100 microns, more preferably 30 to 80 microns, especially for milling applications.

The particle of the invention can contain a water soluble high density metal salt.

The particle size can be controlled using colloidal silica, but this is not a requirement. The combination of the metal modifying agent of the invention and the high density metal of the invention can enable the production of the required particle size of the invention without the use of colloidal stabilizing agent such as silica. If the particle is made using a colloidal stabilizing agent, such as silica, in the aqueous medium, the silica can be removed after the particle is formed following the polymerization reaction to form the high density particle of the invention.

The particles of the invention can remain in suspension, but concentrated to form a slurry of particles suitable for use in a milling operation. The particles can also be re-suspended for use in a milling operation if they were previously dried or concentrated.

The high density particles of the invention can be used in a method of making a fine particle dispersion of an active ingredient, comprising:

a) providing a plurality of milling particles each including a cross-linked organic polymer host matrix and a high density metal provided within the interior of the cross-linked organic polymer host matrix;

b) forming a dispersion having the plurality of particles, a solvent, and an active ingredient that is insoluble in the solvent; and c) milling the dispersion to reduce the size of the active ingredient to thereby produce a fine particle dispersion of the active ingredient in the solvent.

The active ingredient can be any material where fine particle size is desirable for function, such as pharmaceutical compounds, colorants, conductive materials, photographically useful compounds and the like. When the active ingredient is a colorant, it is preferable that the colorant include a pigment.

Use of the particles of the invention for milling is done in a solvent environment. The solvent preferably includes water.

The size of the milling particles is preferably in the range of 20 to 100 microns. The density of the milling particles is greater than 1.25 g/cc. The milling particles are comprised of a high density metal and a cross-linked organic polymer host matrix. the high density metal is at least 10 weight % of the total weight of the high density metal and the cross-linked organic polymer host matrix.

The milled active ingredient fine particle dispersion is preferably milled to less than 250 nm and greater than 0 nm.

In a preferred embodiment, the invention provides a method of making a fine particle dispersion of pigment, comprising:

a) providing a plurality of milling particles each including a cross-linked organic polymer host matrix comprising a copolymer of styrene and divinylbenzene and a high density metal within the interior of the particle, wherein the high density metal includes tungsten or alloys or oxides thereof;

b) forming a dispersion having the plurality of particles, a solvent including water, and colorant including pigments; and c) milling the dispersion to reduce the size of the pigment to thereby produce a fine particle dispersion of the pigment in the solvent wherein the size of the milled pigment dispersion is less than 250 nm and greater than 0 nm.

EXAMPLES

The invention is illustrated by the following examples:

Materials

The initiator, benzoyl peroxide (97% active) and styrene (Reagent Plus >99%) were purchased from Sigma-Aldrich. Divinylbenzene (55% assay) was obtained from Alfa Aesar. Tungsten powder (0.84 um mean diameter) was obtained from Buffalo Tungsten. Sodium polytungstate was purchased as a 86 wt % $WO_3$ solution in water from GEOLIQUIDS, Inc. Ludox™ was obtained as a 50 wt % dispersion in water from Sigma-Aldrich.

For the examples which follow, polymerization inhibitor was removed from the starting monomers prior to use with the following procedure. The monomers were weighed out and stirred in a beaker with a magnetic stir bar, to which 2.375 g aluminum oxide activated neutral (Acros Organics) was added and stirred 30 minutes. The slurry was filtered using a 5 micron filter to remove the aluminum oxide.

Evaluation of Particles

The particles were examined microscopically at a magnification of 200× to evaluate encapsulation of the metal within the particle interior.

Particle Size Measurement

The mean particle sizes and particle size distributions were determined using the Model Horiba LA920

Calculation of Cross-Linking Level

The cross-linking level of a particle is calculated by multiplying the weight of the crosslinkable monomer source times the assay of the active crosslinkable monomer and dividing this by the sum of the crosslinking monomer source and the remaining (non-crosslinking) organic monomers.

For example, the cross-linking level of the mixture of 15.8 g styrene monomer (Sigma-Aldrich ReagentPlus >99%) and 63.2 g divinylbenzene (55% assay, Alfa Aesar) in Inventive Example 1s calculated as follows:

$$(63.2*0.55)/(63.2+15.8)=0.44 \text{ or } 44\%$$

Calculation of % Oversize

The % oversize is a measure of the yield of particles produced that exceed a pre-selected mean diameter (mesh cut) after classifying the particles in a stack of sieving screens.

Comparison Example 1

An oil phase was prepared by dissolving 1 g of Tuftec P2000 and 1.19 g of benzoyl peroxide initiator in 79 g of styrene 20 g of Tungsten powder was then added to the oil phase with stirring.

An aqueous medium was prepared by adding 1 drop of a 10 wt. % potassium dichromate solution to 120 g of an aqueous citrate phosphate buffer (200 mM) at pH 4 with stirring, followed by the addition of 4.5 g of 10 wt. % poly2-methylaminoethanol adipate solution and 0.7 gms Ludox™ colloidal silica were then added to the aqueous phase.

The oil phase was added to the aqueous medium with stirring, then premixed with a SILVERSON L4R mixer and then homogenized with a Microfluidizer [>9000 psi] to form uniform droplets of the oil phase in the aqueous medium. 12 g of a 3.2 weight percent solution of deionized lime-processed gelatin was added to the aqueous medium containing the droplets of oil phase as an additional stabilizer. The mixture was heated to 61° C. with stirring at 150 rpm for 16 hours to effect the polymerization of the oil phase. The temperature was increased to 85° C. for 5 hours, and then was cooled.

A gummy black material was obtained. Microscopic examination of the polymerized particles revealed that the particles did not contain tungsten.

Comparison Example 2

An oil phase was prepared by dissolving 1.19 g of Benzoyl peroxide initiator in a mixture of 16 g styrene monomer and 64 g divinylbenzene. 20 g of Tungsten powder (as in Comparative example 1) was then added to the oil phase with stirring.

An aqueous medium was prepared by adding 1 drop of a 10 wt. % Potassium dichromate solution to 120 g of de-mineralized water with stirring, followed by the addition of 4.5 g of 10 wt. % poly2-methylaminoethanol adipate solution and 0.7 gms Ludox™ were then added to the aqueous phase. The pH was adjusted to pH 4+1-0.2 with 1N HCl.

The oil phase was added to the aqueous medium with stirring, then premixed with a SILVERSON L4R mixer and then homogenized with a Microfluidizer as in Example 1 to form uniform droplets of the oil phase in the aqueous medium. 12 g of a 3.2 weight percent solution of deionized lime-processed gelatin was added to the aqueous medium containing the droplets of oil phase as an additional stabilizer. The mixture was heated to 61° C. with stirring at 150 rpm for 16 hours to effect the polymerization of the oil phase. The temperature was increased to 85° C. for 5 hours, and then was cooled.

The particles were sieved through a 140 mesh (106 micron) screen, then filtered and washed with demineralized water and acetone. The damp cake was then dried 72 hours at 80 C in a vacuum oven.

Invention Example 1

An oil phase was prepared by dissolving 1 g of Tuftec P2000 and 1.19 g of benzoyl peroxide initiator in a mixture of 15.8 g styrene monomer and 63.2 g divinylbenzene. 20 g of Tungsten powder (0.84 um mean diameter from Buffalo Tungsten) was then added to the oil phase with stirring.

An aqueous medium was prepared by adding 1 drop of a 10 wt. % potassium dichromate solution to 120 g of an aqueous citrate phosphate buffer (200 mM) at pH 4 with stirring, followed by the addition of 4.5 g of 10 wt. % poly2-methylaminoethanol adipate solution and 0.7 gms Ludox™ were then added to the aqueous phase.

The oil phase was added to the aqueous medium with stirring, then premixed with a SILVERSON L4R mixer and then homogenized with a Microfluidizer [>9000 psi] to form uniform droplets of the oil phase in the aqueous medium. 12 g of a 3.2 weight percent solution of deionized lime-processed gelatin was added to the aqueous medium containing the droplets of oil phase as an additional stabilizer. The mixture was heated to 61° C. with stirring at 150 rpm for 16 hours to effect the polymerization of the oil phase. The temperature was increased to 85° C. for 5 hours, and then was cooled.

The particles were sieved through a 140 mesh (106 micron) screen, then filtered and washed with demineralized water and acetone. The damp cake was then dried 72 hours at 80 C in a vacuum oven.

Invention Example 1 demonstrates that a cross-linked polymer host matrix in combination with the metal modifying agent Tuftec P2000 produced uniformly sized particles comprising high density metal within the interior of the cross-linked polymer host matrix. Comparison Example 1 did not contain a cross-linkable monomer and the results were unsatisfactory and any particles formed did not contain tungsten. Comparison Example 2 demonstrates that cross-linking alone is insufficient to produce a narrow particle size distribution, as exhibited by the high % oversize and the large standard deviation relative to the mean in Table 1, that is, one standard deviation is nearly 50% of the mean particle diameter, as measured by the coefficient of variation.

Invention Example 2

Invention Example 2 was prepared as Invention Example 1, except that a mixture of 39.5 g Styrene monomer and 39.5 g divinylbenzene.

Invention Example 2 demonstrates that a cross-linking level of 27.5% in combination with the metal modifying agent of the invention provides sufficient cross-linking to maintain the high density metal in the interior of the particles and provide a narrow particle distribution as shown in Table 1.

Invention Example 3

Invention Example 3 was prepared as Invention Example 1, except that a mixture of 63.2 g Styrene monomer and 15.8 g divinylbenzene.

Invention Example 3 demonstrates that a cross-linking level of 11.0% in combination with the metal modifying agent of the invention provides sufficient cross-linking to maintain the high density metal in the interior of the particles although its particle distribution has a standard deviation greater than 25% of the mean diameter.

Invention Example 4

An oil phase was prepared by dissolving 1 g of Kraton 1652 and 0.833 g of benzoyl peroxide initiator (97% from Aldrich) in a mixture of 11.06 g styrene monomer and 44.24 g divinylbenzene. 14 g of Tungsten powder was then added to the oil phase with stirring.

An aqueous medium was prepared by adding 1 drop of a 10 wt. % potassium dichromate solution to 84 g of an aqueous citrate phosphate buffer (200 mM) at pH 4 with stirring, followed by the addition of 3.15 g of 10 wt. % poly2-methylaminoethanol adipate solution and 0.49 gms Ludox™ were then added to the aqueous phase.

The oil phase was added to the aqueous medium with stirring, then premixed with a SILVERSON L4R mixer and then homogenized with a Microfluidizer [>9000 psi] to form uniform droplets of the oil phase in the aqueous medium. 8.4 g of a 3.2 weight percent solution of deionized lime-processed gelatin was added to the aqueous medium containing the droplets of oil phase as an additional stabilizer. The mixture was heated to 61° C. with stirring at 150 rpm for 16 hours to effect the polymerization of the oil phase. The temperature was increased to 85° C. for 5 hours, and then was cooled. The particles were sieved through a 140 mesh (106 micron) screen, then filtered and washed with demineralized water and acetone. The damp cake was then dried 72 hours at 80 C in a vacuum oven.

Invention Example 4 shows the effectiveness of an alternate metal modifying agent as shown in Table 1.

Invention Example 5

Invention Example 5 was prepared as Invention Example 1, except that the oil phase used 2 g of Tuftec P2000 and a mixture of 62.4 g Styrene monomer and 15.6 g divinylbenzene.

Invention Example 6

Invention Example 6 was prepared as Invention Example 1, except that the oil phase used 5 g of Tuftec P2000 and a mixture of 60.0 g Styrene monomer and 15.0 g divinylbenzene.

Invention Example 5 and Invention Example 6 demonstrate that mean particle size can be increased with increasing metal modifying agent while maintaining the high density metal interior to the particle as shown in Table 1.

Invention Example 7

Invention Example 7 was prepared as Invention Example 6, except that no Ludox™ was added to the aqueous medium.

Invention Example 7 demonstrates that the cross-linked polymer host matrix in combination with the metal modifying agent Tuftec P2000 in the absence of colloidal silica in the aqueous medium produced uniformly sized particles comprising high density metal within the interior of the cross-linked polymer host matrix as shown in Table 1.

Invention Example 8

An oil phase was prepared by dissolving 2 g of Tuftec P2000 and 2.37 g of benzoyl peroxide initiator in a mixture of 31.6 g styrene monomer and 126.4 g divinylbenzene. 40 g of Tungsten powder was then added to the oil phase with stirring.

An aqueous medium was prepared by adding 159.6 g of a sodium polytungstate solution to 240 g of demineralized water adjusted to pH 4 with 1N HCl with stirring, adding 1 drop of a 10 wt. % potassium dichromate solution followed by the addition of 9.0 g of 10 wt. % poly2-methylaminoethanol adipate solution and 1.4 gms Ludox™ were then added to the aqueous phase.

The oil phase was added to the aqueous medium with stirring, then premixed with a SILVERSON L4R mixer and then homogenized with a Microfluidizer [>9000 psi] to form uniform droplets of the oil phase in the aqueous medium. 24 g of a 3.2 weight percent solution of deionized lime-processed gelatin was added to the aqueous medium containing the droplets of oil phase as an additional stabilizer. The mixture was heated to 61° C. with stirring at 150 rpm for 4 hours to effect the polymerization of the oil phase. The temperature was increased to 80° C. for 15 hours, and then was cooled.

The particles were sieved through a 400 mesh (38 micron) screen, and then filtered. The slurry was adjusted to pH 12.6 with potassium hydroxide and held for 30 minutes to remove the silica. The slurry was filtered and washed with about 6 liters of de-mineralized water until the pH was below 8. The filtered cake was washed with methanol. The damp cake was then dried 72 hours at 80° C. in a vacuum oven. The cake was sieved in a stack of sieves 200, 325, and 625 mesh sieves, yielding 100 g of dried particles in the 325 mesh sieve.

Invention Example 8 demonstrates that additional increases in density of the particles can be achieved by incorporating a water dispersible form of high density metal in the aqueous phase during preparation of the particles as shown in Table 1.

TABLE 1

| | Cross-linking level (%) | Metal modifying agent | Level of metal modifying agent wt % | Silica present | Particle Density (g/cc) | Particle Mean Diameter (μm) | Particle Diameter Standard Deviation | Particle Diameter Coefficient of Variation | % Oversize | Mesh Cut (μm) | Microscopic Inspection |
|---|---|---|---|---|---|---|---|---|---|---|---|
| Comparison Example 1 | 0.0% | Tuftec P2000 | 1.0% | Yes | | | | | | | High density Metal not in interior |
| Comparison Example 2 | 44.0% | none | None | Yes | 1.3592 | 52.062 | 24.6264 | 43.6032 | 7.89 | 106 | High density Metal not in interior |
| Invention Example 1 | 44.0% | Tuftec P2000 | 1.0% | Yes | 1.336 | 52.9072 | 15.9533 | 30.1534 | 1.47 | 106 | High density Metal in interior |
| Invention Example 2 | 27.5% | Tuftec P2000 | 1.0% | Yes | 1.3244 | 60.1587 | 21.0632 | 34.4403 | 2.23 | 106 | High density Metal in interior |
| Invention Example 3 | 11.0% | Tuftec P2000 | 1.0% | Yes | 1.3268 | 82.2892 | 52.8564 | 64.2325 | 12.67 | 106 | High density Metal in interior |
| Invention Example 4 | 44.0% | Kraton 1652 | 1.0% | Yes | 1.3272 | 68.3969 | 19.2629 | 28.1632 | 2.74 | 106 | High density Metal in interior |
| Invention Example 5 | 44.0% | Tuftec P2000 | 2.0% | Yes | 1.3449 | 64.4378 | 17.5621 | 27.2543 | 3.04 | 106 | High density Metal in interior |
| Invention Example 6 | 44.0% | Tuftec P2000 | 5.0% | Yes | 1.3352 | 91.3924 | 24.6174 | 26.2543 | 10.28 | 125 | High density Metal in interior |
| Invention Example 7 | 44.0% | Tuftec P2000 | 5.0% | No | 1.3167 | 113.4462 | 30.0334 | 26.4737 | 8.89 | 180 | High density Metal in interior |
| Invention Example 8 | 44.0% | Tuftec P2000 | 1.0% | Yes | 1.4050 | 54.7828 | 14.3088 | 25.3673 | | 106 | High density Metal in interior |

Milling Examples

Comparison Pigment Dispersion A was prepared by combining 6.89 g Pigment Yellow 155 IJ Yellow 4GP2532 (Clariant), 17.23 g of a 10 wt % aqueous solution of potassium methyl oleoyl taurate surfactant, 44.79 g of high purity water and 40 mL (48.8 g) of Comparison Example 2 beads in a 1 L stainless steel jacketed vessel. The dispersion was stirred with a 40 mm Cowles blade for 24 hours at a tip speed of 3.4 m/s, or 1800 rpm. Dispersion samples were extracted at periodic intervals and measured by light scattering using a Microtrac UPA 150© particle sizing instrument.

Inventive Pigment Dispersion B was made in the same way except that 40 mL (62.4 g) of Invention Example 8 beads were substituted for the Comparison Example 2 beads.

The particle size data below shows that Inventive Pigment Dispersion B milled with the Invention Example 8 beads milled at a faster rate than Comparison Pigment Dispersion A milled with an equal volume, or number, of Comparison Example 2 beads.

|  | Sample ID | time (hr) | UPA 10% vol, nm | UPA 50% vol, nm | UPA 95% vol, nm |
|---|---|---|---|---|---|
| Invention | Inventive Pigment Dispersion B | 4.5 | 37.2 | 86.3 | 237.9 |
|  |  | 7.0 | 29.7 | 63.5 | 210.8 |
|  |  | 21.5 | 17.4 | 24.5 | 135.1 |
|  |  | 23.5 | 17.7 | 25.6 | 143.3 |
|  | final | 24.0 | 16.7 | 24.0 | 138.5 |
| Comparison | Comparison Pigment Dispersion A | 4.75 | 58.3 | 103.7 | 394.6 |
|  |  | 6.75 | 43.8 | 82.5 | 250.5 |
|  |  | 21.50 | 41.6 | 77.5 | 201.1 |
|  |  | 24.00 | 17.1 | 25.9 | 150.8 |
|  | final | 24.00 | 18.2 | 27.5 | 152.7 |

The foregoing specification is intended as illustrative and is not to be taken as limiting. Still other variations within the spirit and the scope of the invention are possible and will readily present themselves to those skilled in the art.

The invention has been described in detail with particular reference to certain preferred embodiments thereof, but it will be understood that variations and modifications can be effected within the spirit and scope of the invention.

The invention claimed is:

1. A method of making an organic polymeric particle, suitable for use in milling, comprising the steps of:
   (a) providing an oil phase comprising a metal, a metal modifying agent, a cross-linkable organic monomer mixture, and an oil soluble polymerization initiator, wherein the metal has a density of greater than or equal to 8.0 g/cc;
   (b) admixing the oil phase in an aqueous medium to produce droplets of the oil phase in the aqueous medium, wherein the aqueous medium further comprises a water soluble metal salt and wherein the water soluble metal salt is sodium polytungstate;
   (c) adding a hydrocolloid to the aqueous medium containing the droplets of the oil phase; and
   (d) polymerizing the droplets of the oil phase to produce organic polymeric particles comprising a cross-linked polymer host matrix and a metal wherein the metal is within the interior of the cross-linked polymer host matrix.

2. The method of claim 1, wherein the cross-linkable organic monomer mixture comprises at least 11 weight % of a cross-linkable monomer.

3. The method of claim 1, wherein the cross-linkable organic monomer mixture comprises at least 27.5 weight % of a cross-linkable monomer.

4. The method of claim 1, wherein the diameter of the organic polymeric particles is in the range of 20 to 100 microns.

5. The method of claim 1, wherein the metal has a density of greater than or equal to 10.0 g/cc.

6. The method of claim 1, wherein the metal is at least 5 weight % of the total weight of the metal and the cross-linkable organic monomer mixture.

7. The method of claim 6, wherein the metal is at least 10 weight % of the total weight of the metal and the cross-linkable organic monomer mixture.

8. The method of claim 1, wherein the metal comprises iridium, tungsten, tungsten oxide, tungsten carbide, gold, mercury, lead, silver, molybdenum, copper, cobalt, nickel, or brass.

9. The method of claim 1, wherein the cross-linkable organic monomer mixture comprises divinylbenzene.

10. The method of claim 9, wherein the cross-linkable organic monomer mixture further comprises styrene.

11. The method of claim 10, wherein the divinylbenzene is at least 11 weight % of the sum of the weights of styrene and divinylbenzene.

12. The method of claim 11, wherein the divinylbenzene is at least 27.5 weight % of the sum of the weights of styrene and divinylbenzene.

13. The method of claim 1, wherein the metal modifying agent comprises styrene.

14. The method of claim 1, in which the aqueous medium has dispersed therein a particulate stabilizer.

15. The method of claim 14, in which the particulate stabilizer is colloidal silica.

16. The method of claim 15, further comprising:
   (e) washing and removing the silica from the surface of the organic polymeric particles.

17. The method of claim 1, further comprising the step:
   (f) isolating and drying said particles.

18. The method of claim 1, wherein the hydrocolloid is gelatin.

* * * * *